Aug. 9, 1955 A. HUFNAGEL 2,715,164
CODE GENERATING DEVICE
Filed May 21, 1952
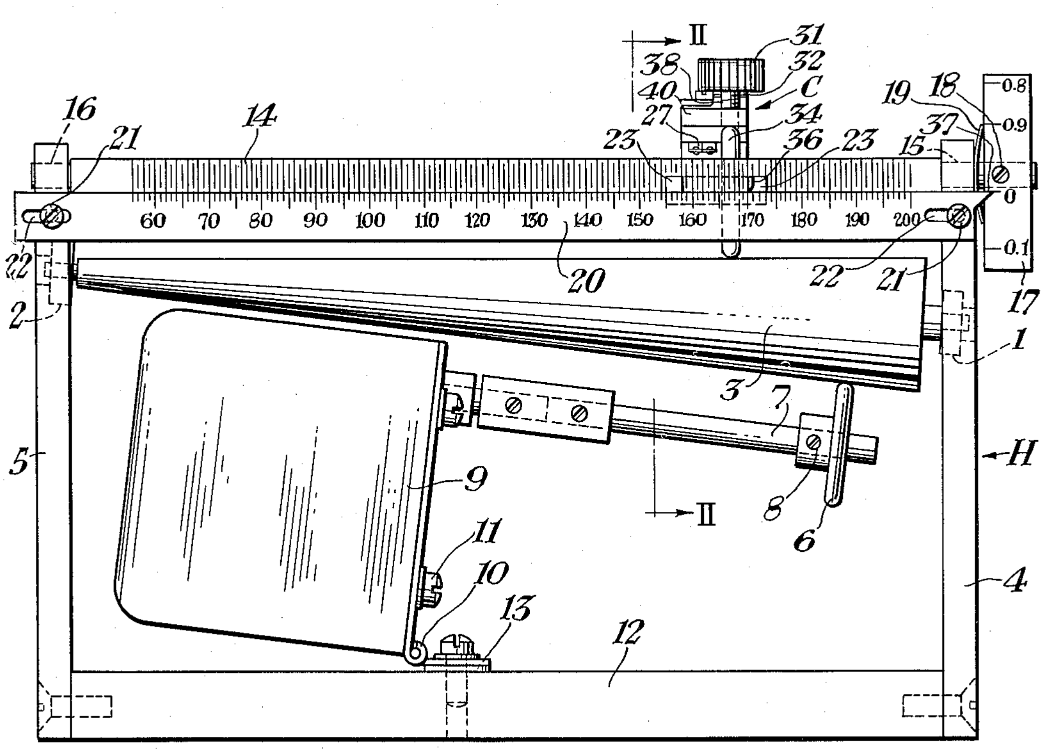
Fig. 1.
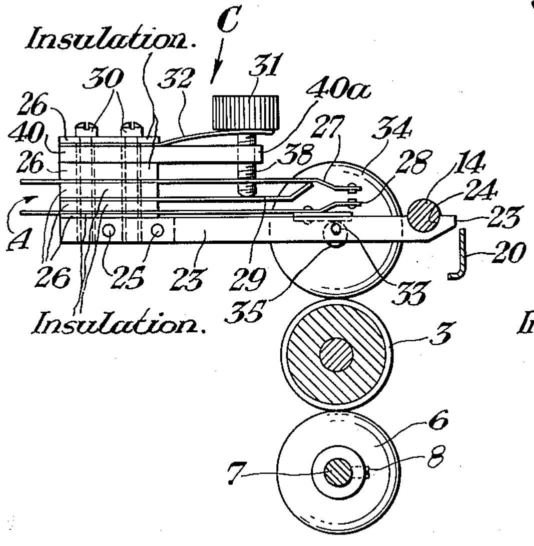
Fig. 2.
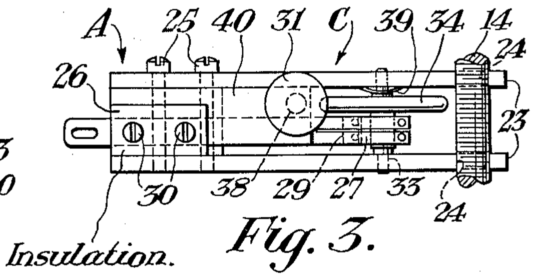
INVENTOR.
Andrew Hufnagel.
BY W. L. Stout.
HIS ATTORNEY 2,715,164
Patented Aug. 9, 1955

1

2,715,164

CODE GENERATING DEVICE

Andrew Hufnagel, Penn Township, Allegheny County, Pa., assignor to Westinghouse Air Brake Company, Wilmerding, Pa., a corporation of Pennsylvania Application May 21, 1952, Serial No. 289,066

3 Claims. (Cl. 200—30)

My invention relates to a code generating device, and in particular to a code generating device suitable for calibrating and testing apparatus used in coded railway signaling systems.

In railway signaling systems utilizing coded track circuits and/or coded cab signals, code generating devices of various types are used to generate codes, the frequencies of which are indicative of certain track conditions. These frequencies are usually 75 cycles per minute for the control of a low speed signal, 120 cycles per minute for the control of a medium speed signal, and 180 cycles per minute for the control of a high speed signal. These systems include decoding units which are selectively responsive to the code frequencies. These decoding units may comprise tuned circuits or frequency sensitive relays.

The signaling currents which are coded in these systems are usually either direct current or alternating current having a frequency of the order of 100 cycles per second. The decoding devices are so constructed that they operate most efficiently when the "on" and "off" times of the coded currents are as nearly equal as possible. The frequencies which the code generators generate and the frequencies which the decoding units respond to must be adjusted to quite accurate limits. Heretofore, this tuning has been done by code transmitters using a multiplicity of cams and contacts driven by gears. Such transmitters are unwieldy in size and provide only certain set frequencies rather than a continuously adjustable range of frequencies.

One object of my invention is to provide a code generating device of convenient size and light weight, for tuning code generators and detectors rapidly and inexpensively and which device generates, over a continuous range, codes of the frequencies usually used in railway signaling.

A further object of my invention is to provide a code generating device having a continuously variable adjustment of the code "on" time.

According to my invention, the code generating device comprises a tapered roller which is driven at a constant speed, and which drives a cam through a friction driving means capable of being moved to any position along the tapered roller, thus providing a means for adjusting the angular velocity of the cam. The cam, in turn, actuates a movable contact finger which cooperates with a stationary contact finger to form an electrical contact. The amount of separation between the stationary contact finger and the movable contact finger is continuously adjustable by suitable means so as to provide a means for adjusting the amount of time per cycle that the contact fingers are actually in engagement, that is, "on" time adjustment. Also included in my invention are means for compensating for possible errors in the angular velocity of the tapered roller and in the taper of the tapered roller.

Other objects of my invention will appear hereinafter as the characteristic features of construction and mode

2 of operation of my code generating device are described in detail.

I shall describe one form of a code generating device embodying my invention, and shall then point out the novel features thereof in claims.

In the accompanying drawings, Fig. 1 is a front elevational view of a code generating device embodying my invention. Fig. 2 is a sectional view of my code generating device taken along lines II—II of Fig. 1. Fig. 3 is a top view of the carriage of my code generating device.

Similar reference characters refer to similar parts of each of the several views.

Referring now to the drawings, the code generating device in the form here illustrated comprises a suitable housing H including walls 4 and 5 and a bottom plate 12. Journaled in bearings 1 and 2 provided in the side walls 4 and 5 is a tapered roller 3. The tapered roller 3 is preferably so disposed that its uppermost element is horizontal. The tapered roller 3 is engaged by a driving friction wheel 6 mounted on a shaft 7 which is driven by a constant speed prime mover 9 such as, although not necessarily, a synchronous motor provided with suitable reduction gearing (not shown). The prime mover 9 is secured by means of a hinge 10 to the bottom plate 12 in such manner that the driving friction wheel 6 is biased by gravity into engagement with tapered roller 3, as can be seen in Fig. 1. The driving friction wheel 6 may be adjustably secured to the shaft 7 in any desired longitudinal position along the shaft by means of a set screw 8, and it follows, therefore, that the speed at which the tapered roller is driven by the motor may be varied within predetermined limits, thereby providing a means to compensate for wear of the friction wheel 6.

A threaded shaft 14 is journaled in bearings 15 and 16 provided in the side walls 4 and 5, respectively, in such a manner that the threaded shaft is parallel to the uppermost element of tapered roller 3. One end of threaded shaft 14 extends through side wall 4 and has mounted thereon a calibrated wheel 17 secured in place by a set screw 18. It follows that rotation of calibrated wheel 17 will rotate threaded shaft 14. A spring washer 19 is interposed between the calibrated wheel 17 and the side wall 4 and takes up any end play of the threaded shaft 14 in the bearings 15 and 16. Mounted on the side walls 4 and 5 by screws 21 is a scale 20 which extends parallel to the shaft 14 and is graduated in cycles per minute. Scale 20 has two longitudinal slots 22 to receive the screws 21. These slots 22 make the position of scale 20 adjustable which is desirable for reasons which will be described presently.

The code generating device also includes a carriage C having two side members 23. The side members 23 are held in parallel space relation by screws 25 which run through the side members 23 and a contact assembly A. The contact assembly A comprises insulating spacers 26, a metallic spacer 40, a fixed contact finger 27, a movable contact finger 28, a stop 29 and a spring 32. Fixed contact finger 27 is biased by its own resiliency into engagement with stop 29 so that if the position of stop 29 is changed, the position of fixed contact finger 27 will change correspondingly. Threaded through the free end 40*a* of the metallic spacer 40 is a threaded adjusting screw 38 provided with a knob 31 which adjusts the position of stop 29 and hence adjusts the position of fixed contact finger 27. The reason for this adjustment will become clear shortly. The spring 32 cooperates with the head 31 of the adjusting screw 38 to hold the screw 38 in any desired position by friction.

An axle 33 is journaled in the side members 23. Fixedly mounted on axle 33 is a friction wheel 34 and a cam 35. A spring washer 39 takes up any end play in the axle 33. Friction wheel 34 engages tapered roller 3 so that if tapered roller 3 is rotating, friction wheel 34 and cam 35 will also rotate. Cut in the top surface of each side member 23 is a groove 24 provided with threads of the same pitch as the threads on the shaft 14. The grooves 24 engage the under side of the threaded shaft 14 and since the center of gravity of carriage C is to the left of the point of engagement of friction wheel 34 and tapered roller 3, as viewed in Fig. 2, it will be seen that the friction wheel 34 is biased into engagement with tapered roller 3 by gravity.

The cam 35 is designed to actuate the movable contact finger 28 once per revolution bringing it into engagement with fixed contact finger 27. By varying the position of fixed contact finger 27 by turning knob 31 and threaded screw 38 in the manner previously described, the amount of time per revolution the contact fingers 27 and 28 actually remain in engagement can be varied. This provides a continuous "on" time adjustment.

The angular velocity of the friction wheel 34 and cam 35 can be varied by changing the position of the friction wheel 34 with respect to the tapered roller 3. It should be clear that this change in position can be caused by rotating threaded shaft 14, which rotation imparts linear motion to carriage C. This change of position can also be achieved by disengaging the threaded grooves 24 from the threaded shaft 14 and manually moving the carriage C. The angular velocity at which cam 35 rotates controls the frequency of engagement of contact fingers 27 and 28. The taper of tapered roller 3 is preferably such that a change in position of carriage C caused by one revolution of threaded shaft 14 will cause a one cycle per minute change in the frequency of engagement of the contact fingers 27 and 28.

In order to adjust my code generating device so as to generate any specific code frequency, the threaded grooves 24 are first disengaged from the threaded shaft 14 and the carriage C is manually moved to the approximate position along the tapered roller which will yield the desired frequency, as indicated by the scale 20. Carriage C is equipped with an index 36, which as shown here is painted on one of the side members 23, and which points to markings on scale 20 to indicate the frequency the code generator is generating. In order to adjust the carriage C so that its index 36 is right on the desired frequency, the calibrated wheel 17 may be turned until the index 36 is on the proper mark of scale 20 and the calibrated wheel's "zero" mark lines up with an indicator tab 37 mounted on scale 20. Of course, the entire movement of carriage C can be accomplished by rotating threaded shaft 14 by turning calibrated wheel 17. However, the manual movement is more satisfactory since it is more rapid.

If frequencies are desired of higher values than those which can be obtained by using the carriage C heretofore described, all that need be done is to replace carriage C with another carriage of similar design but having a cam wihch actuates the movable contact finger twice, three times or even more times per revolution, always keeping in mind that when this is done a multiplying factor must be used in reading the scale 20 correctly.

As was pointed out earlier, compensation for wear in the driving friction wheel 6 can be made by changing the point of contact of driving friction wheel 6 and tapered roller 3. Compensation may also be made for wear in the driving friction wheel 6 and for error in the taper of tapered roller 3 by changing the position of scale 20, which can be accomplished by loosening screws 21 and sliding the scale 20 along slots 22.

The per cent "on" time of the contact 27—28 may be adjusted by connecting in series a source of energy, the contact 27—28 and a means for measuring the per cent "on" time, such as an on time meter. The prime mover is then energized, and the position of stop 29 and fixed contact finger 27 are changed by turning knob 31 and threaded screw 38 until the on time meter indicates the desired per cent "on" time.

A code generating device embodying my invention is particularly useful as a laboratory test device for checking the tuning of a code transmitter. When used for this purpose, a first indicating device such as a light bulb is connected with the transmitter in such manner that the light will flash in response to the code generated by the transmitter, and the contact 27—28 of my code generating device is connected in series with an energy source to an adjacent indicating device. The frequency of my code generating device is then adjusted by first disconnecting the carriage from the screw and moving it to the position which will cause the contact 27—28 to operate at approximately the desired code rate and then reengaging the carriage with the threaded shaft 14 and thereafter moving the carriage by means of the calibrated wheel 17 until the light bulbs flash in unison. This unison flashing indicates that both devices are generating a code signal of the same frequency, and that frequency can be determined by reading scale 20 and calibrated wheel 17. The code transmitter can then be subjected to various applied voltages and conditions of adjustment, and any deviation from the optimum frequency will be immediately indicated, and its extent can be quickly determined by a slight readjustment of calibrated wheel 17.

Another important laboratory use of my code generating device is to check the frequency response of code detecting equipment. A code detector can be properly tuned by connecting it in series with an energy source to the contact of my code generating device and adjusting the frequency of my code generating device to the desired frequency, in the manner heretofore described. The code detector can then be adjusted by suitable means to respond to the frequency desired.

Although I have herein shown and described only one form of a code generating device embodying my invention, it will be understood that various changes and modifications may be made therein within the scope of the appended claims without departing from the spirit and scope of my invention.

Having thus described my invention, what I claim is:

1. A code generating device comprising a tapered roller which is rotatably mounted and driven at a constant angular velocity, a threaded shaft which is rotatably mounted parallel to the uppermost element of said tapered roller, means for at times rotating said threaded shaft, a movable carriage having an operatively connected cam and friction wheel rotatably mounted therein and a contact assembly including a first and second contact members mounted thereon, said carriage being provided with a threaded portion engaging and cooperating with said threaded shaft so that when said threaded shaft is rotated said carriage moves axially along said threaded shaft, the parts of said carrige being so proportioned that said friction wheel is biased into engagement with said tapered roller by the weight of said carriage, said first contact member adapted to be actuated by said cam, said second contact member adapted to be engaged by said first contact member when said first contact member is actuated by said cam, and means for adjusting the spacing between said contact members.

2. A code generating device for generating electrical impulses of a continuous frequency range comprising a housing, a constant speed prime mover, a shaft driven by said prime mover, a driving friction wheel adjustably mounted on said shaft, a tapered roller rotatably mounted in said housing so that its uppermost element is horizontal, a hinge affixed to said housing and to said prime mover in such a manner that the gravity pull on said prime mover biases said driving friction wheel into engagement with said tapered roller, a threaded shaft rotatably mounted in said housing parallel to the uppermost element of said tapered roller and provided at one end with a hand wheel for at times rotating said threaded shaft, a carriage comprising members in parallel space relation having an operatively connected friction wheel and cam rotatably mounted between them, one of said members being provided with an index, each of said members being further provided in its top surface with a threaded groove engaging said threaded shaft so that when said threaded shaft is rotated said carriage will move axially along said threaded shaft, the parts of said carriage being so proportioned that said friction wheel is biased into engagement with said tapered roller by the weight of said carriage, a first contact finger adapted to be actuated by said cam and a second contact finger biased by its own resiliency toward the first contact finger and adapted to be engaged by said first contact finger when said first contact finger is so actuated, a stop for adjusting the position of said second contact finger and hence adjusting the spacing between said contact fingers, and a graduated scale adjustably mounted on said housing parallel to said threaded shaft cooperating with said index for indicating the frequency of engagement of said contact fingers.

3. In a code generating device including a tapered roller having its uppermost element substantially horizontal, in combination, a rotatable threaded shaft substantially parallel to said uppermost element of said tapered roller and positioned on one side of said tapered roller, a carriage having a friction wheel rotatably mounted thereon so that the lower portion of said wheel extends below the bottom of said carriage for engaging said tapered roller, a threaded groove in an upper surface of said carriage adapted to engage a lower portion of said threaded shaft; the parts being so proportioned that the center of gravity of said carriage is on the side of said tapered roller opposite to said groove so that when said groove is engaging said threaded shaft the weight of said carriage will bias said friction wheel into engagement with said tapered roller; and contact means actuated by the rotation of said friction wheel.

References Cited in the file of this patent

UNITED STATES PATENTS

| | | |
|---|---|---|
| 1,354,832 | Jung | Oct. 5, 1920 |
| 1,461,001 | Hartford | July 3, 1923 |
| 2,341,390 | Scott | Feb. 8, 1944 |